(12) United States Patent
Kim et al.

(10) Patent No.: US 12,465,189 B2
(45) Date of Patent: Nov. 11, 2025

(54) DISHWASHER

(71) Applicant: LG ELECTRONICS INC., Seoul (KR)

(72) Inventors: Jin Tae Kim, Seoul (KR); Jae Chul Lee, Seoul (KR); Seokhyun Kim, Seoul (KR); Jukwang Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 217 days.

(21) Appl. No.: 18/269,523

(22) PCT Filed: Dec. 9, 2021

(86) PCT No.: PCT/KR2021/018626
§ 371 (c)(1),
(2) Date: Jun. 23, 2023

(87) PCT Pub. No.: WO2022/139268
PCT Pub. Date: Jun. 30, 2022

(65) Prior Publication Data
US 2024/0057842 A1    Feb. 22, 2024

(30) Foreign Application Priority Data
Dec. 23, 2020   (KR) .................. 10-2020-0182041

(51) Int. Cl.
*A47L 15/00*   (2006.01)
*A47L 15/42*   (2006.01)
(Continued)

(52) U.S. Cl.
CPC ....... *A47L 15/0028* (2013.01); *A47L 15/0049* (2013.01); *A47L 15/4219* (2013.01);
(Continued)

(58) Field of Classification Search
CPC ............................................. A47L 15/00–508
See application file for complete search history.

(56) References Cited

U.S. PATENT DOCUMENTS

| 6,675,818 B1 * | 1/2004 | Schrott | A47L 15/0049 |
| | | | 134/57 D |
| 2007/0057665 A1 * | 3/2007 | Borst | G01D 11/245 |
| | | | 324/207.2 |

(Continued)

FOREIGN PATENT DOCUMENTS

| CN | 209463943 U | 10/2019 |
| DE | 3732451 A1 * | 4/1989 |

(Continued)

OTHER PUBLICATIONS

DE3732451A1 Machine Translation (Year: 1989).*

(Continued)

*Primary Examiner* — Spencer E. Bell
(74) *Attorney, Agent, or Firm* — Fish & Richardson P.C.

(57) ABSTRACT

A dishwasher includes a tub, a sump, a wash pump, a rack, a nozzle disposed at a lower end of the rack, the nozzle being rotated by a force of wash water supplied from the wash pump and having a magnetic object coupled to one end of the nozzle so that a first pole and a second pole of the magnetic object face a rotation direction of the nozzle, a sensing module that senses a magnetic force generated by the magnetic object, and a controller receiving sensing results from the sensing module, and determining one or more of a rotation direction of the nozzle, a rotation speed of the nozzle, or whether the nozzle rotates, to output an abnormality notification to a user or control wash water supplied to the nozzle through the wash pump.

14 Claims, 18 Drawing Sheets

(51) Int. Cl.
*A47L 15/44* (2006.01)
*A47L 15/50* (2006.01)

(52) U.S. Cl.
CPC ......... *A47L 15/4257* (2013.01); *A47L 15/428* (2013.01); *A47L 15/44* (2013.01); *A47L 15/504* (2013.01); *A47L 2401/34* (2013.01); *A47L 2501/01* (2013.01); *A47L 2501/26* (2013.01)

(56) References Cited

U.S. PATENT DOCUMENTS

| | | | | |
|---|---|---|---|---|
| 2013/0139860 | A1* | 6/2013 | Forster | A47L 15/23 134/198 |
| 2015/0128999 | A1 | 5/2015 | Park et al. | |
| 2018/0008119 | A1* | 1/2018 | Pleschinger | A47L 15/4409 |
| 2018/0271351 | A1 | 9/2018 | Park et al. | |
| 2019/0290095 | A1* | 9/2019 | Wahlberg | A47L 15/23 |

FOREIGN PATENT DOCUMENTS

| | | | |
|---|---|---|---|
| DE | 4020898 A1 | 1/1992 | |
| DE | 10121083 A1 | 10/2002 | |
| DE | 102005033109 A1 | 1/2007 | |
| DE | 102006007329 A1 | 8/2007 | |
| EP | 1238622 A2 | 9/2002 | |
| EP | 1275335 A1 * | 1/2003 | ......... A47L 15/4229 |
| JP | H07313434 A | 12/1995 | |
| JP | 2008228813 A | 10/2008 | |
| KR | 19950008354 B1 | 7/1995 | |
| KR | 20150054611 A | 5/2015 | |
| KR | 102128283 B1 | 6/2020 | |

OTHER PUBLICATIONS

DE102006007329A1 Machine Translation (Year: 2007).*
PCT International Search Report and Written Opinion in International Appln. No. KR/2021/018626, dated Mar. 23, 2022, 10 pages (with English translation).
Extended European Search Report in European Appln. No. 21911335.4, mailed on Nov. 12, 2024, 9 pages.

* cited by examiner

DISHWASHER

CROSS-REFERENCE TO RELATED APPLICATIONS

This application is a National Stage application under 35 U.S.C. § 371 of International Application No. PCT/KR2021/018626, filed on Dec. 9, 2021, which claims the benefit of Korean Patent Application No. 10-2020-0182041, filed on Dec. 23, 2020. The disclosures of the prior applications are incorporated by reference in their entirety.

TECHNICAL FIELD

The present disclosure relates to a dishwasher.

BACKGROUND ART

Dishwashers are home appliances that spray wash water to wash targets such as cooking vessels or cooking tools and the like, to remove foreign substances remaining at the wash targets.

A dishwasher ordinarily comprises a tub providing a wash space, a rack provided in the tub and accommodating cooking vessels, a nozzle spraying wash water to the rack, a sump storing wash water, and a wash pump supplying the washer water stored in the sump to the nozzle.

The nozzle sprays wash water to wash targets evenly, while rotating. However, in the case where wash targets are disposed in an area where the nozzle rotates, the wash targets can prevent the nozzle from rotating smoothly. Additionally, in the case where contaminants are excessively stacked at a filter around the wash pump, the nozzle cannot rotate smoothly, for the reason that wash water supplied from the wash pump cannot be supplied to the nozzle smoothly, and the like. At this time, the wash targets are not washed properly by the wash water, causing deterioration in the wash performance of the dishwasher.

To solve the above problem caused by failure to rotate a nozzle smoothly, an example dishwasher capable of sensing whether a nozzle rotates is disclosed in DE 10-2006-007329 that was patented.

The dishwasher senses the alternation of a magnetic field generated by a magnetic object that is included at both ends of a nozzle, by using a Hall sensor, to sense whether the nozzle rotates. However, the Hall sensor can sense the rotation of the nozzle, as the Hall sensor senses the alternation of the polarity of a magnet. Unless two magnets are inserted into both ends of the nozzle in a way that the polarities of the two magnets are opposite to each other, the Hall sensor cannot sense the rotation of the nozzle.

Furthermore, since the Hall sensor cannot sense a rotation direction and a rotation speed of the nozzle, the rotation of the nozzle cannot be controlled precisely.

DESCRIPTION OF INVENTION

Technical Problems

The objective of the present disclosure is to provide a dishwasher capable of sensing whether a nozzle rotates, with a single magnet that is inserted into the nozzle.

The objective of the present disclosure is to provide a dishwasher capable of sensing a rotation direction and a rotation speed of a nozzle, to control the rotation of the nozzle precisely.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

Technical Solutions

A dishwasher of one embodiment comprises a tub having a wash space in which a wash target is accommodated, a sump disposed at a lower end of the tub and storing wash water, a wash pump supplying the wash water that is accommodated in the sump to a nozzle, a rack disposed in the wash space and storing the wash target, a nozzle disposed at a lower end of the rack, rotated by a repulsive force of the wash water supplied from the wash pump, spraying the wash water to the wash target, and having a magnetic object coupled to one end of the nozzle so that a first pole and a second pole of the magnetic object face a rotation direction of the nozzle, a sensing module comprising a Hall sensor that senses a magnetic force generated by the magnetic object generated by a rotation of the nozzle, and a controller receiving sensing results from the sensing module, and determining one or more of a rotation direction of the nozzle, a rotation speed of the nozzle and whether the nozzle rotates, based on the sensing results, to output an abnormality notification to a user or control wash water supplied to the nozzle through the wash pump.

In one embodiment, the rack comprises a first rack disposed in an upper portion of the wash space and moving up and down, the nozzle comprises a first nozzle disposed at a lower end of the first rack, and moving up and down together with the first rack, and the sensing module comprises a first sensing module comprising a Hall sensor that is disposed in a position corresponding to a middle end of a range in which the first nozzle moves up and down.

In one embodiment, a first magnetic object is coupled to one end of the first nozzle, and a first weight having weight that corresponds to weight of the first magnetic object is accommodated at the other end of the first nozzle.

In one embodiment, the dishwasher further comprises a door provided on one surface of the tub, and opening and closing the wash space, a dispenser disposed in one area of the door, and supplying detergents to the wash space, and a fixation bracket which is coupled to the dispenser, and on which the first sensing module is mounted.

In one embodiment, the rack comprises a second rack disposed in a lower portion of the wash space, the nozzle comprises a second nozzle disposed at a lower end of the second rack, and the sensing module comprises a second sensing module coupled to one side of the sump.

In one embodiment, a second magnetic object is coupled to one end of the second nozzle, and a second weight having weight that corresponds to weight of the second magnetic object is accommodated at the other end of the second nozzle.

In one embodiment, the Hall sensor is a linear Hall sensor.

In one embodiment, the controller determines that a magnetic force generated by the first pole of the magnetic object is sensed in a case where an output value of the sensing module is less than a predetermined first reference value, determines that a magnetic force generated by the second pole of the magnetic object is sensed in a case where an output value of the sensing module is a predetermined second reference value or greater, and determines that a magnetic force generated by the magnetic object is not sensed in a case where an output value of the sensing module is the first reference value or greater and less than the second reference value.

In one embodiment, in a case where a magnetic force generated by the magnetic object is not sensed through the sensing module and then a magnetic force generated by the first pole of the magnetic object is first sensed, the controller determines that a rotation direction of the nozzle is a first direction, and in a case where a magnetic force generated by the magnetic object is not sensed through the sensing module and then a magnetic force generated by the second pole of the magnetic object is first sensed, the controller determines that a rotation direction of the nozzle is a second direction.

In one embodiment, the controller calculates a rotation speed of the nozzle by using magnetic force sensing time for which a magnetic force generated by the magnetic object is sensed through the sensing module, and magnetic force non-sensing time for which a magnetic force generated by the magnetic object is not sensed through the sensing module.

In one embodiment, the controller determines that the nozzle is restricted, and outputs an abnormality notification to a user in a case where the magnetic force non-sensing time is predetermined reference time or greater.

In one embodiment, the controller determines that the nozzle is restricted, and outputs an abnormality notification to a user, in a case where a rotation speed of the nozzle is less than a predetermined minimum rotation speed.

In one embodiment, the controller controls wash water supplied to the nozzle through the wash pump, based on results of comparison between a rotation speed of the nozzle and a predetermined reference rotation speed.

In one embodiment, the reference rotation speed is set differently depending on a rotation direction of the nozzle.

In one embodiment, the controller controls wash water supplied to the nozzle through the wash pump, in a case where a rotation speed of the nozzle is less than the reference rotation speed, to increase the rotation speed of the nozzle, and controls wash water supplied to the nozzle through the wash pump, in a case where a rotation speed of the nozzle is the reference rotation speed or greater, to decrease the rotation speed of the nozzle.

Advantageous Effects

In a dishwasher of one embodiment, a single magnet can be used to sense whether a nozzle rotates, by using a magnetic object that is coupled to one end of the nozzle and a sensing module that comprises a Hall sensor.

Further, in the dishwasher of one embodiment, a magnetic object is coupled to the nozzle so that a first pole and a second pole of the magnetic object face a rotation direction of the nozzle, and a linear Hall sensor is used as a Hall sensor, to sense a rotation direction and a rotation speed of the nozzle and precisely control the rotation of the nozzle, ensuring improvement in the performance of the dishwasher.

Specific effects are described along with the above-described effects in the section of detailed description.

DETAILED DESCRIPTION OF EXEMPLARY EMBODIMENTS

Figure 1:
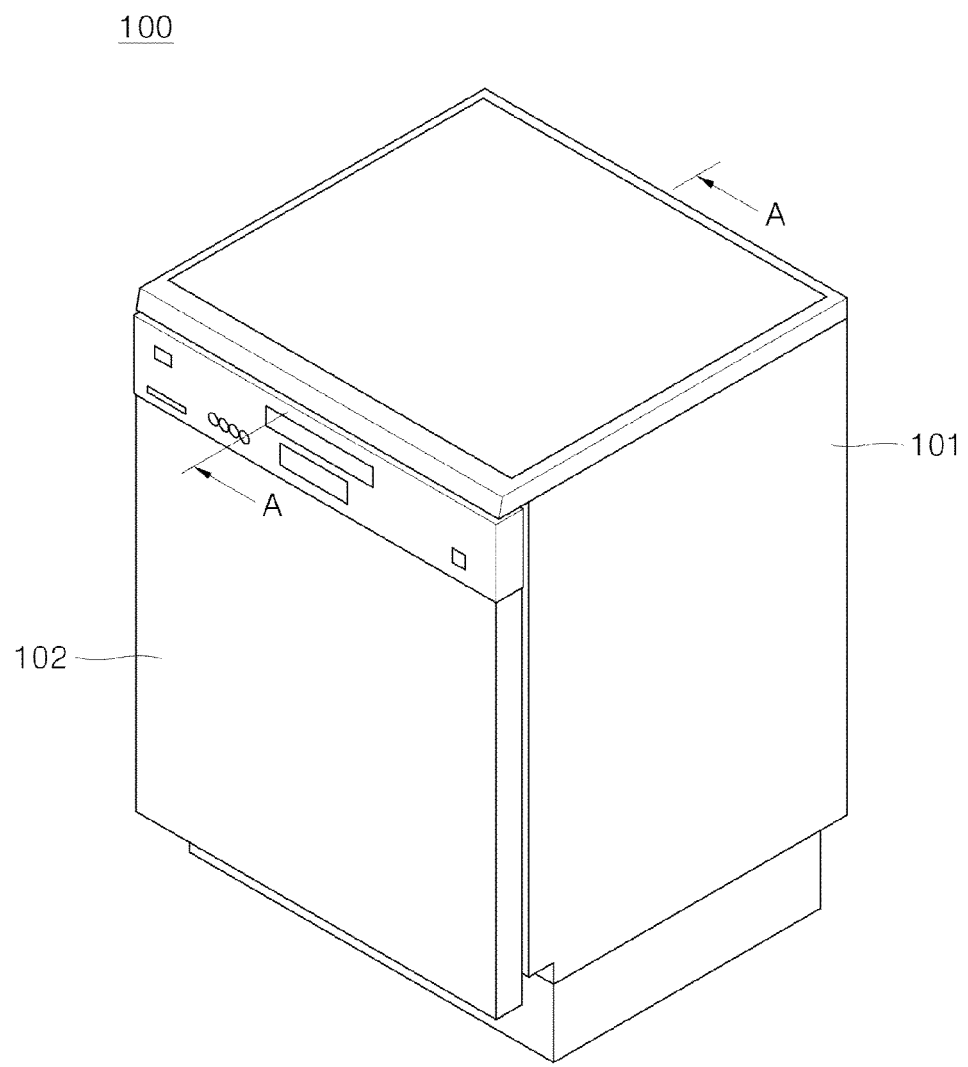
FIG. 1 is a perspective view showing a dishwasher of one embodiment.

The above-described aspects, features and advantages are specifically described hereafter with reference to accompanying drawings such that one having ordinary skill in the art to which the present disclosure pertains can embody the technical spirit of the disclosure easily. In the disclosure, detailed description of known technologies in relation to the subject matter of the disclosure is omitted if it is deemed to make the gist of the disclosure unnecessarily vague. Hereafter, preferred embodiments according to the disclosure are specifically described with reference to the accompanying drawings. In the drawings, identical reference numerals can denote identical or similar components.

The terms "first", "second" and the like are used herein only to distinguish one component from another component. Thus, the components are not to be limited by the terms. Certainly, a first component can be a second component, unless stated to the contrary.

When one component is described as "in the upper portion (or lower portion)" or "on (or under)" another component, one component can be directly on (or under) another component, and an additional component can be interposed between the two components.

When any one component is described as "connected", "coupled", or "connected" to another component, any one component can be directly connected or coupled to another component, but an additional component can be "interposed" between the two components or the two components can be "connected", "coupled", or "connected" by an additional component.

Throughout the disclosure, each component can be provided as a single one or a plurality of ones, unless explicitly stated to the contrary.

The singular forms "a", "an" and "the" are intended to include the plural forms as well, unless explicitly indicated otherwise. It is to be further understood that the terms "comprise" or "include" and the like, set forth herein, are not interpreted as necessarily including all the stated components or steps but can be interpreted as excluding some of the stated components or steps or can be interpreted as including additional components or steps.

Hereafter, a dishwasher of several embodiments is described.

FIG. 1 is a perspective view showing a dishwasher of one embodiment.

Referring to FIG. 1, the exterior of the dishwasher 100 of one embodiment is illustrated in a perspective view. The dishwasher 100 of one embodiment may comprise a case 101 and a door 102.

The case 101 forms the exterior of the dishwasher 100. The case 101 may be shaped into a cuboid one surface of which is open, and have a tub 110 therein.

The door 102 is provided on one surface of the case 101, which is open, and opens and closes a vacant space in the case 101. The door 102 may be opened or closed automatically or manually.

Components disposed in the vacant space of the case 101 are described with reference to FIGS. 2 and 3.

Figure 2:
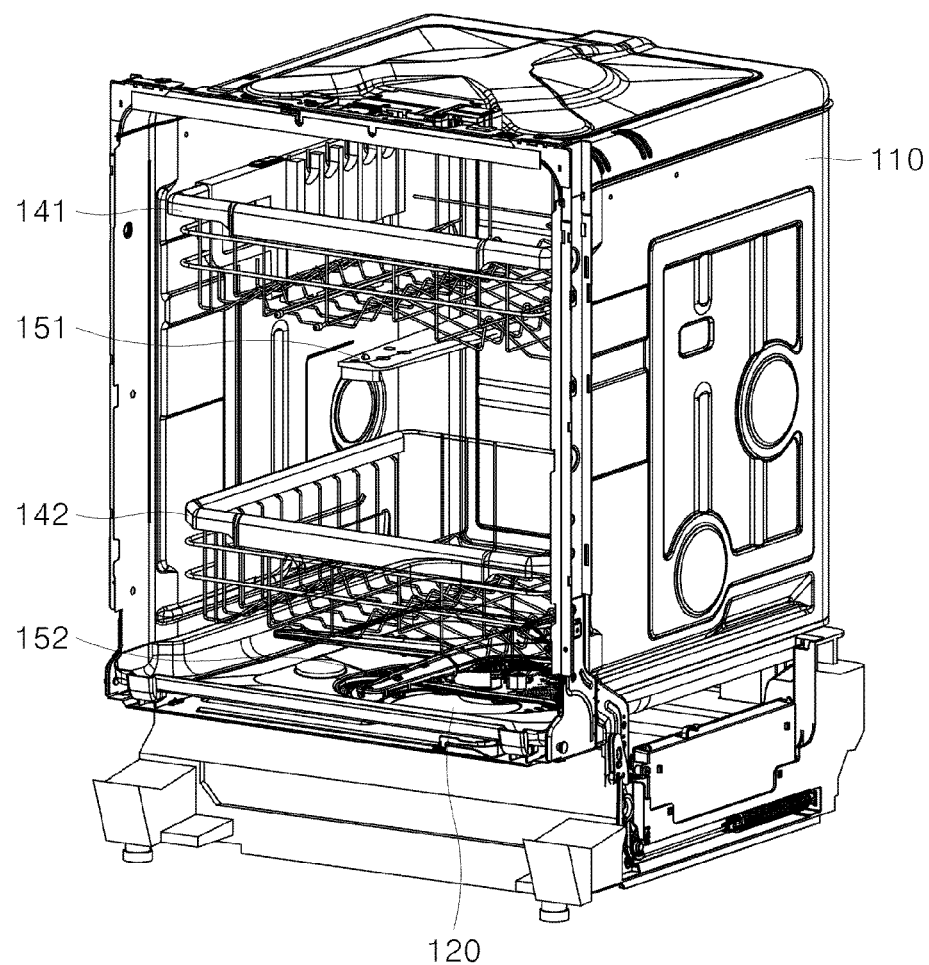
FIG. 2 is a perspective view showing the dishwasher of one embodiment without a case and a door.

FIG. 2 is a perspective view showing the dishwasher of one embodiment without a case and a door. FIG. 3 is a cross-sectional view along line "A-A" of FIG. 1.

Figure 3:
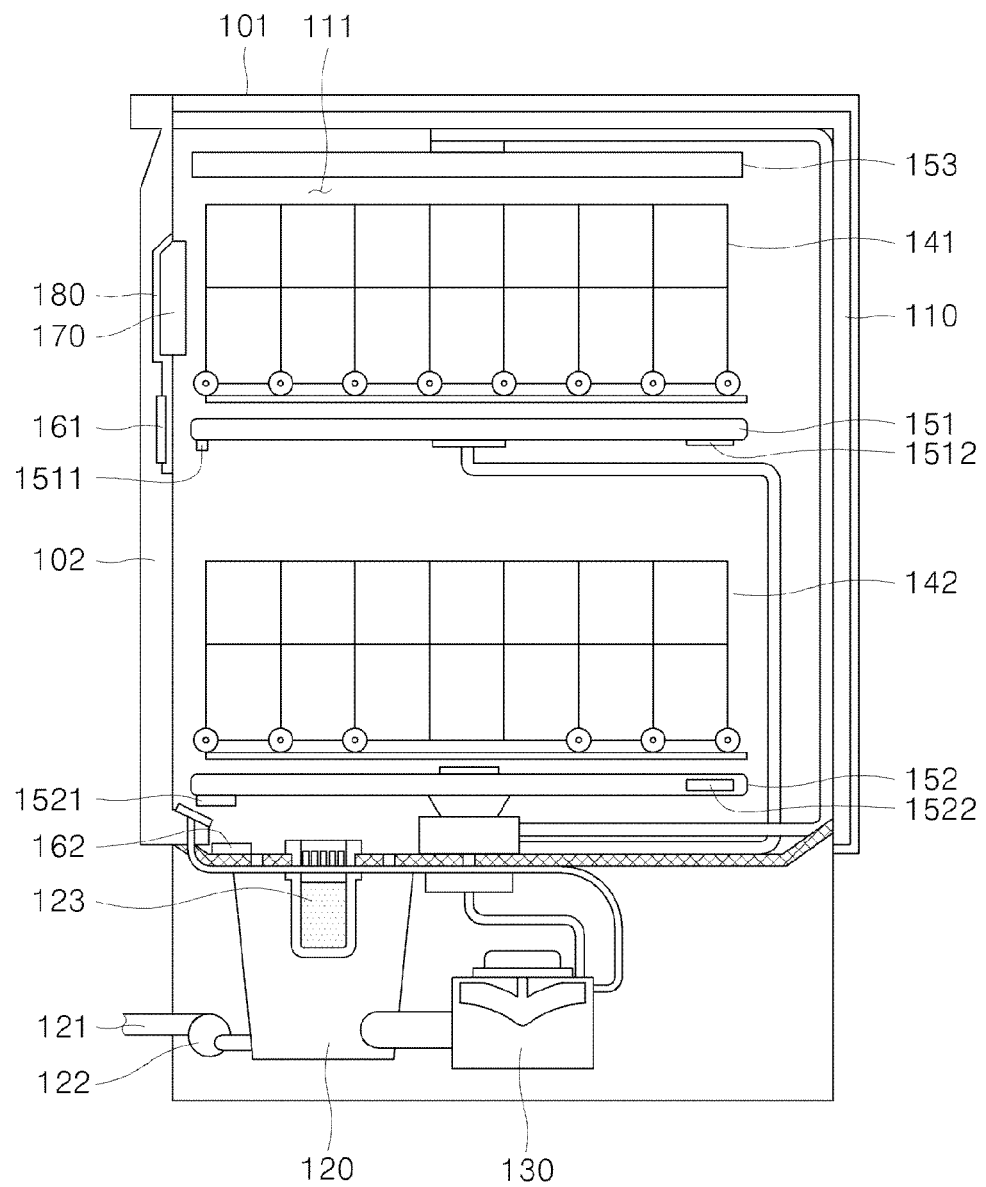
FIG. 3 is a cross-sectional view along line "A-A" of FIG. 1.

Referring to FIGS. 2 and 3, the dishwasher 100 of one embodiment comprises a tub 110, a sump 120, a wash pump 130, racks 141, 142, nozzles 151, 152, 153 and sensing modules 161, 162. Though not illustrated in the drawing, the dishwasher 100 of one embodiment comprises a controller. Additionally, the dishwasher 100 of one embodiment may further comprise a dispenser 170 and a fixation bracket 180.

The tub 110 may be provided in the case 101, and shaped into a cuboid one surface of which is open. At this time, one surface of the tub 110, which is open, may be a surface corresponding to one surface of the case 101, which is open. Accordingly, one surface of the tub 110, which is open, may be opened and closed by the door 102. A wash space 111 in which wash targets are accommodated is formed in the tub 110.

The sump 120 is disposed at the lower end of the tub 110. The sump 120 stores wash water, and collects wash water that is used to wash wash targets.

The sump 120 connects to a drainage path 121 that guides stored wash water to the outside of the dishwasher 100. The sump 120 may discharge wash water out of the dishwasher 100 through the drainage path 121.

A drainage pump 122 may discharge wash water stored in the sump 120 through the drainage path 121. The drainage pump 122 may comprise a drainage motor (not illustrated) that generates a rotational force. As the drainage pump 122 operates, wash water stored in the sump 120 may be discharged out of the dishwasher 100 through the drainage path 121.

A filter 123 is disposed between the tub 110 and the sump 120, to filter contaminants included in wash water that flows into the sump 120 from the tub 110.

The wash pump 130 may supply wash water stored in the sump 120 to the nozzles 151, 152, 153. The wash pump 130 may comprise a wash motor (not illustrated) that generates a rotational force. As the wash pump 130 operates, wash water stored in the sump 120 may be supplied to the nozzles 151, 152, 153. The wash pump 130 may operate based on an instruction that is received from the controller described hereafter.

The racks 141, 142 are disposed in the wash space 111, and accommodates wash targets. The racks 141, 142 may comprise a first rack 141 and a second rack 142. The first rack 141 may be disposed in the upper portion of the wash space 111, and the second rack 142 may be disposed in the lower portion of the wash space 111.

The nozzles 151, 152, 153 are disposed in the wash space 111, and spray wash water to wash targets. The nozzles 151, 152, 153 may comprise a first nozzle 151, a second nozzle 152 and a third nozzle 153.

The first nozzle 151 may be disposed at the lower end of the first rack 141, and spray wash water upward. That is, the first nozzle 151 may spray wash water to wash targets accommodated in the first rack 141. In one embodiment, the first nozzle 151 may spray wash water to wash targets while rotating based on a repulsive force of wash water supplied from the sump 120.

The second nozzle 152 may be disposed at the lower end of the second rack 142, and spray wash water upward. That is, the second nozzle 152 may spray wash water to wash targets stored in the second rack 142. In one embodiment, the second nozzle 152 may spray wash water to wash targets while rotation based on a repulsive force of wash water supplied from the sump 120.

The third nozzle 153 may be disposed at the upper end of the first rack 141, and spray wash water downward. That is, the third nozzle 153 may spray wash water to wash targets stored in the first rack 141 and the second rack 142. In one embodiment, the third nozzle 153 may spray wash water to wash targets while the third nozzle 142 does not rotate.

As describe above, in the dishwasher 100 of one embodiment, the first nozzle 151 and the second nozzle 152 spray wash water while they rotate, and the third nozzle 153 may spray wash water while it does not rotate, but are not limited thereto. However, in the following, description is provided based on one embodiment in which first nozzle 151 and second nozzle 152 of the dishwasher 100 spray wash water while they rotate, and third nozzle 153 of the dishwasher 100 sprays wash water while it does not rotate, for convenience of description.

The sensing modules 161, 162 is disposed in an area corresponding to a range in which the nozzles 151, 152, 153 operate and comprises a Hall sensor sensing a magnetic force generated by a magnetic object. The sensing modules 161, 162 may comprise a first sensing module 161 and a second sensing module 163.

Detailed structures of the racks 141, 142, the nozzles 151, 152, 153 and the sensing modules 161, 162 are described with reference to FIGS. 4 to 15.

Figure 4:
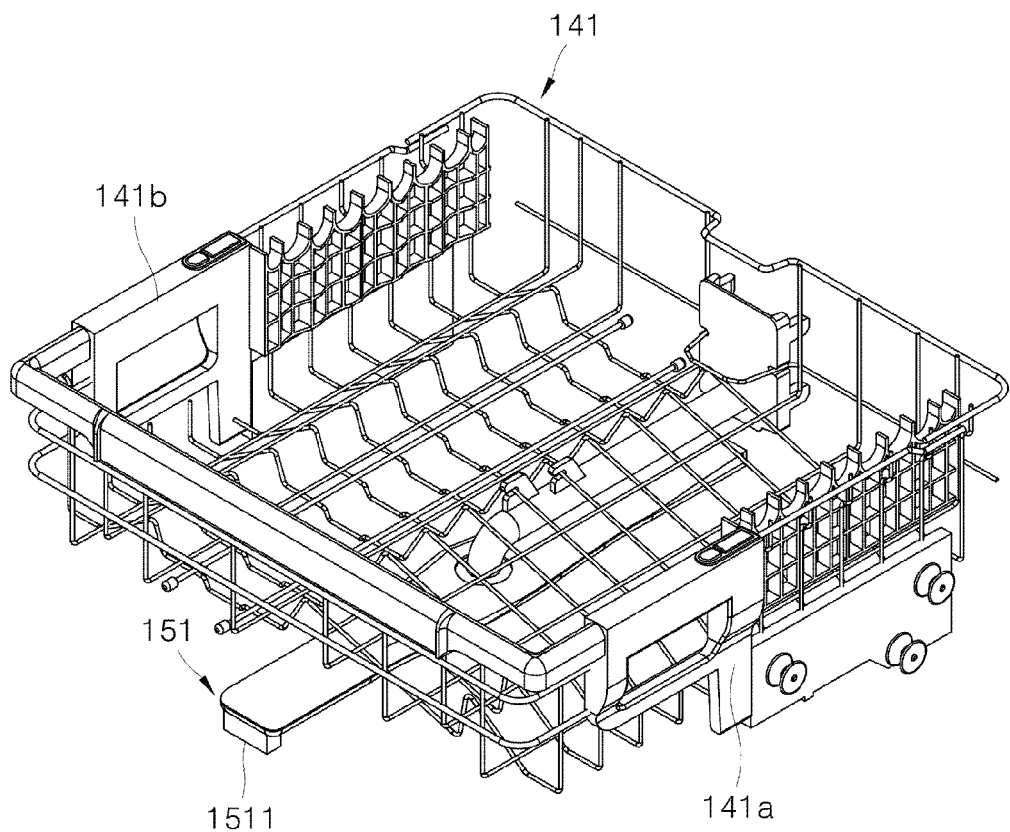
FIG. 4 is a perspective view showing a first rack and a first nozzle of the dishwasher of one embodiment only.

FIG. 4 is a perspective view showing a first rack and a first nozzle of the dishwasher of one embodiment only.

Referring to FIG. 4, the first rack 141 may connect to the first nozzle 151.

The first rack 141 may comprise height adjustment parts 141a, 141b. The height adjustment parts 141a, 141b allows the first rack 141 to move up and down within a predetermined operation range.

At this time, the first nozzle 151 may connect to the first rack 141. Accordingly, the first nozzle 151 may move up and down, together with the first rack 141.

A first magnetic object 1511 is coupled to one end of the first nozzle 151, and a first weight 1512 may be provided at the other end of the first nozzle 151. A detailed structure of the first nozzle 151 is described with reference to FIGS. Sand 6.

Figure 5:
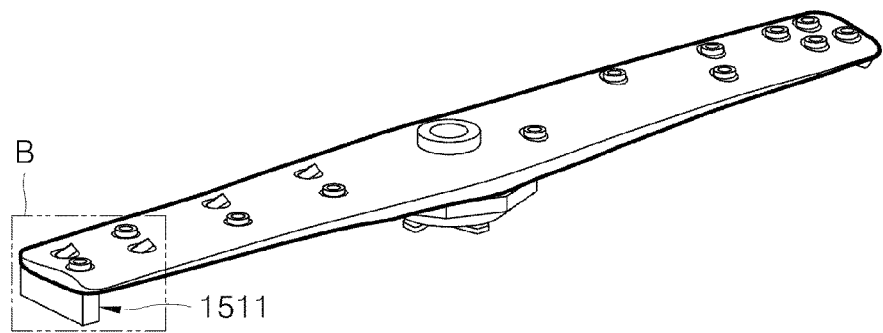
FIG. 5 is a perspective view showing the first nozzle of the dishwasher of one embodiment only.
Figure 6:
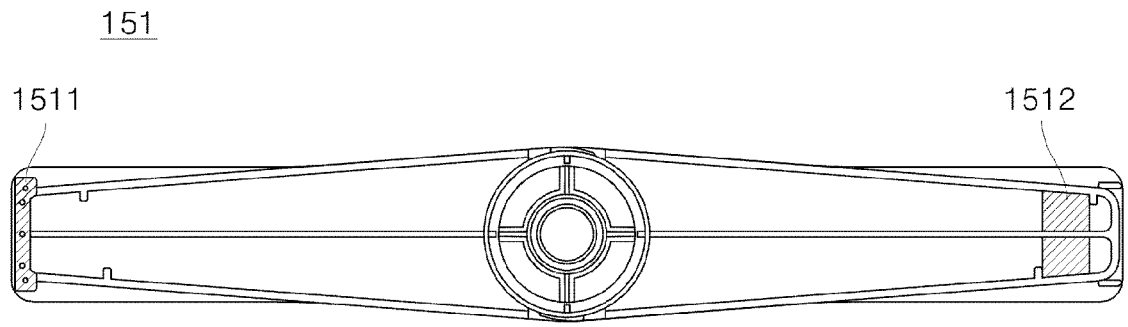
FIG. 6 is a view showing the first nozzle of the dishwasher of one embodiment, viewed from below.

FIG. 5 is a perspective view showing the first nozzle of the dishwasher of one embodiment only. FIG. 6 is a view showing the first nozzle of the dishwasher of one embodiment, viewed from below.

Referring to FIGS. 5 and 6, a first magnetic object 1511 is coupled to one end of the first nozzle 151, and a first weight 1512 is accommodated at the other end of the first nozzle 151.

Since the first magnetic object 1511 causes a change in a magnetic field by rotating together with the first nozzle 151, to enable the first sensing module 161 to sense a magnetic force generated by the first magnetic object 1511, as the first nozzle 151 rotates. In one embodiment, the first magnetic object 1511 may be a magnet.

The first magnetic object 1511 is coupled to the first nozzle 151 in a way that a first pole and a second pole of the first magnetic object 1511 face a rotation direction of the first nozzle 151. That is, the first magnetic object 1511 is coupled to the first nozzle 151 in a way that both poles of the first magnetic object 1511 face the rotation direction of the first nozzle 151. The first pole may be the N pole and the second pole may be an S pole, but not limited thereto. The first pole may be an S pole and the second pole may be an N pole.

Figure 7:
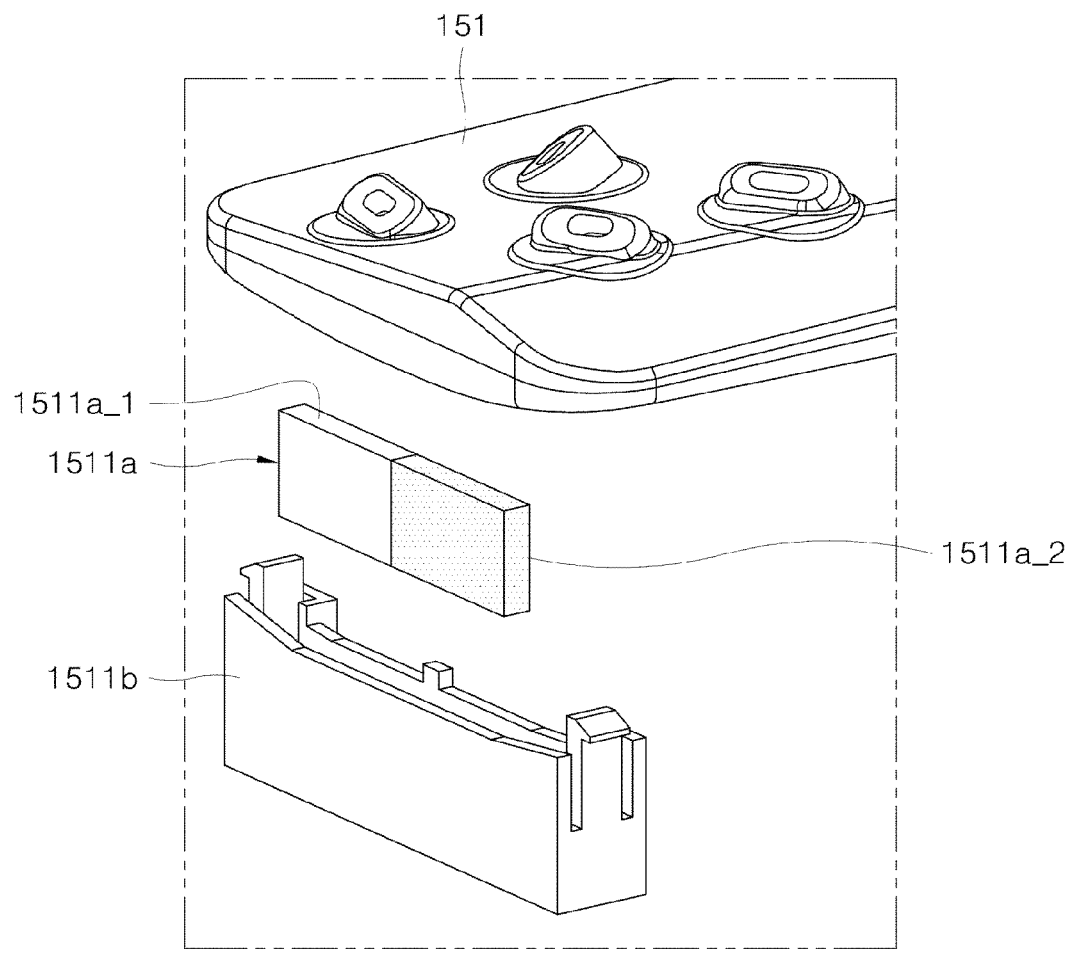
FIG. 7 is a view separately showing a structure in which a first magnetic object is coupled to the first nozzle, in the dishwasher of one embodiment.

A structure in which the first magnetic object 1511 is coupled to the first nozzle 151 is shown in FIG. 7.

FIG. 7 is a view separately showing a structure in which a first magnetic object is coupled to the first nozzle, in the dishwasher of one embodiment.

Referring to FIG. 7, the first magnetic object 1511 may be coupled to the lower side of one end of the first nozzle 151.

The first magnetic object 1511 may be coupled to the lower side of one end of the first nozzle 151 in a way that a first magnet 1511a is accommodated inside a first magnet case 1511b. The first magnetic object 1511 may be coupled to the first nozzle 151 in a way that a first pole 1511a1 and a second pole 1511a2 of the first magnet 1511a respectively face the rotation direction of the first nozzle 151, while the first pole 1511a_1 and the second pole 1511a_2 face in opposite directions.

The first magnet case 1511b may have a shape corresponding to the shape of the first magnet 1511a. For example, in the case where the first magnet 1511a has a bar shape, the first magnet case 1511b may have a rectangular cuboid shape to accommodate a bar magnet.

Referring back to FIGS. 5 and 6, the first weight 1512 has weight corresponding to the weight of the first magnetic object 1511. At this time, the first weight 1512 may be coupled to the lower side of the other end of the first nozzle 151.

The first weight 1512 is disposed in the end portion of the first nozzle 151, which is opposite to the end portion of the first nozzle 151 where the first magnetic object 1511 is disposed, so that the center of gravity of the first nozzle 151 to move to the center of the first nozzle 151. By disposing the first weight 1512 as describe above, the shake of the first nozzle 151 while rotating of the first nozzle 151 may be prevented, which may be caused by a misalignment of the center of gravity of the first nozzle 151 with the center of the first nozzle 151 due to the first magnetic object 1511 disposed at one end of the first nozzle 151.

Figure 8:
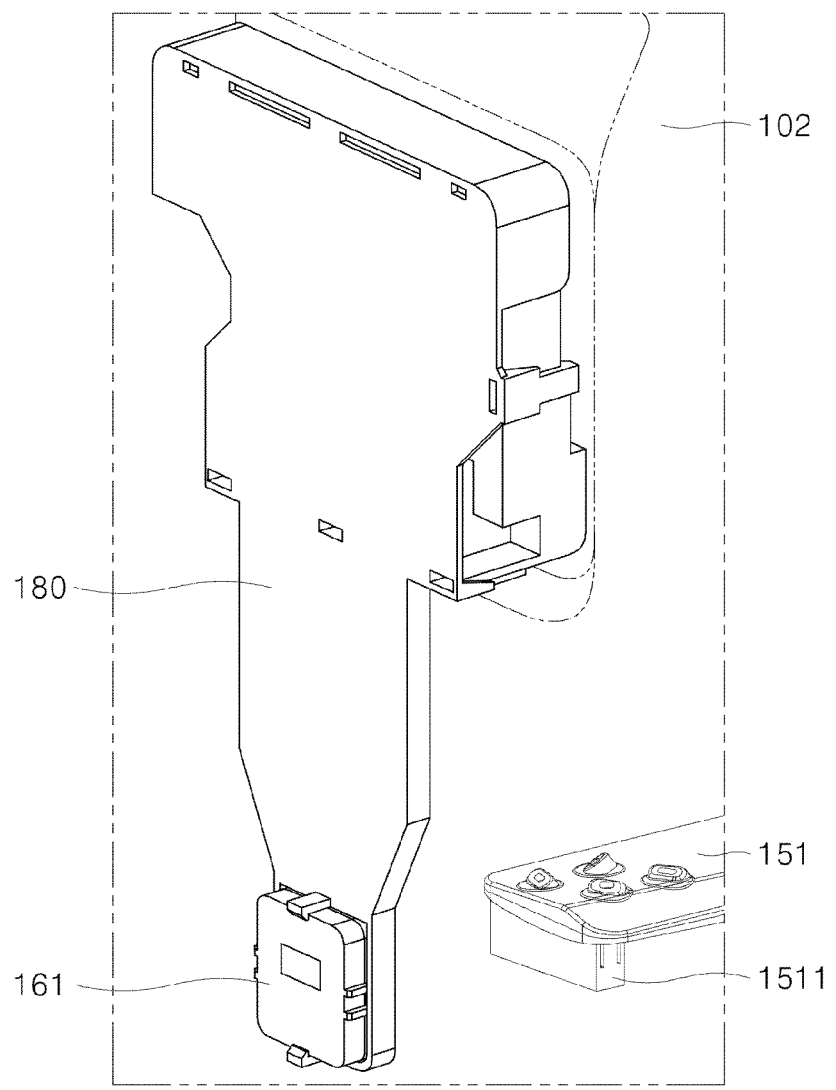
FIG. 8 is a view showing a structure in which a first sensing module is coupled to a dispenser through a fixation bracket, in the dishwasher of one embodiment.

FIG. 8 is a view showing a structure in which a first sensing module is coupled to a dispenser through a fixation bracket, in the dishwasher of one embodiment.

Referring to FIG. 8, the first sensing module 161 is coupled to the lower end of the dispenser 170 through the fixation bracket 180.

The dispenser 170 is disposed in one area of the door 102. At this time, the dispenser 170 may be disposed at the center of the upper end of the inner surface of the door 102, to allow the user to insert detergents readily. The dispenser 170 may supply detergents to the wash space 111 when the dishwasher 100 performs a process in which detergents are required.

The fixation bracket 180 is coupled to the dispenser 170. One end of the fixation bracket 180 is coupled to the dispenser 170 disposed at the door 102, and the first sensing module 161 is coupled to the other end of the fixation bracket 180. Since the first sensing module 161 is coupled to the dispenser 170 through the fixation bracket 180 as described above, the first magnetic object 1511 coupled to the first nozzle 151 may approach to the first sensing module 161, as illustrated in FIG. 7. Accordingly, the first sensing module 161 may sense a magnetic force generated by the first magnetic object 1511.

A detailed structure of the first sensing module 161 is described with reference to FIG. 9.

Figure 9:
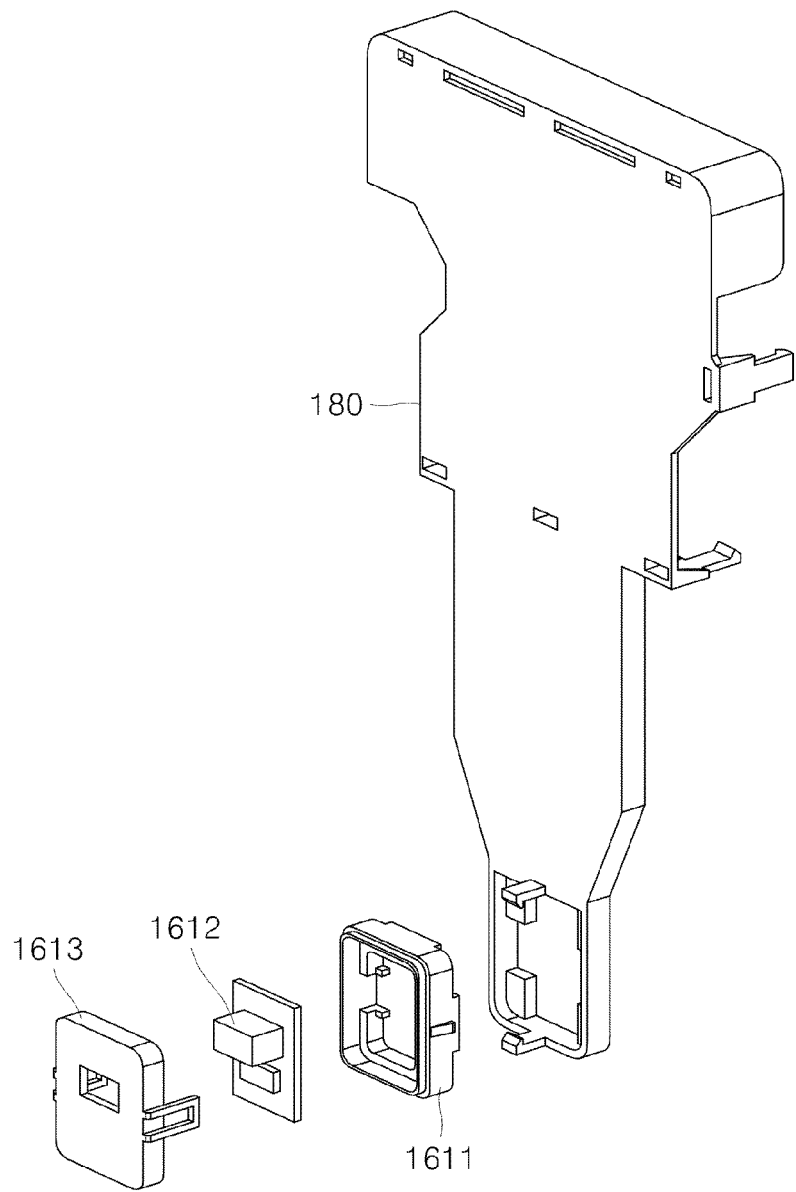
FIG. 9 is a view separately showing the first sensing module and the fixation bracket, in the dishwasher of one embodiment.

FIG. 9 is a view separately showing the first sensing module and the fixation bracket, in the dishwasher of one embodiment.

Referring to FIG. 9, the first sensing module 161 is disassembled and illustrated in a perspective view. The first sensing module 161 may comprise a first sensing module case 1611, a first Hall sensor 1612, and a first sensing module cover 1613.

The first sensing module case 1611 is formed in a way that the first sensing module case 1611 is directly coupled to the fixation bracket 180, and accommodates the first Hall sensor 1612.

The first sensing module cover 1613 covers the first Hall sensor 1612 accommodated in the first sensing module case 1611, to prevent the first Hall sensor 1612 from exposed to the outside.

The first Hall sensor 1612 senses a change in the magnetic force generated by the first magnetic object 1511. The first Hall sensor 1612 may be mounted on a substrate.

The first Hall sensor 1612 may be a linear Hall sensor that can output different output values depending on the polarity of a sensed magnetic force.

The first Hall sensor 1612 may be disposed in the meddle end of the range in which the first rack 141 and the first nozzle 151 can move up and down.

Figure 10:
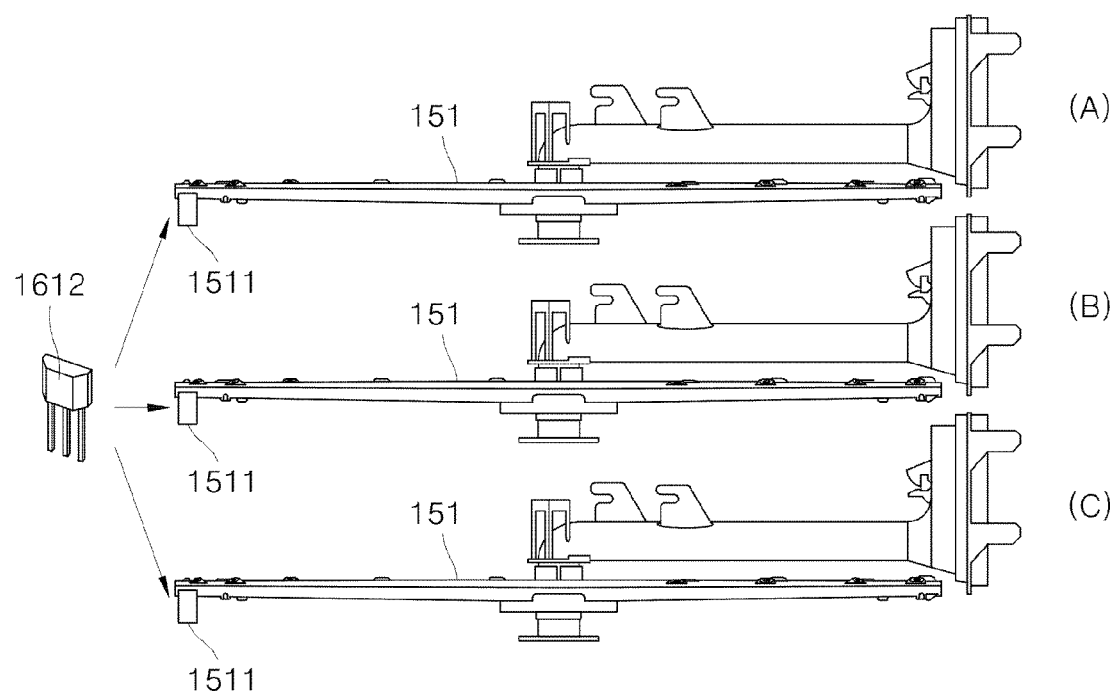
FIG. 10 is a view for describing a relationship between the position of the first nozzle and the position of the first Hall sensor, in the dishwasher of one embodiment.
Figure 11:
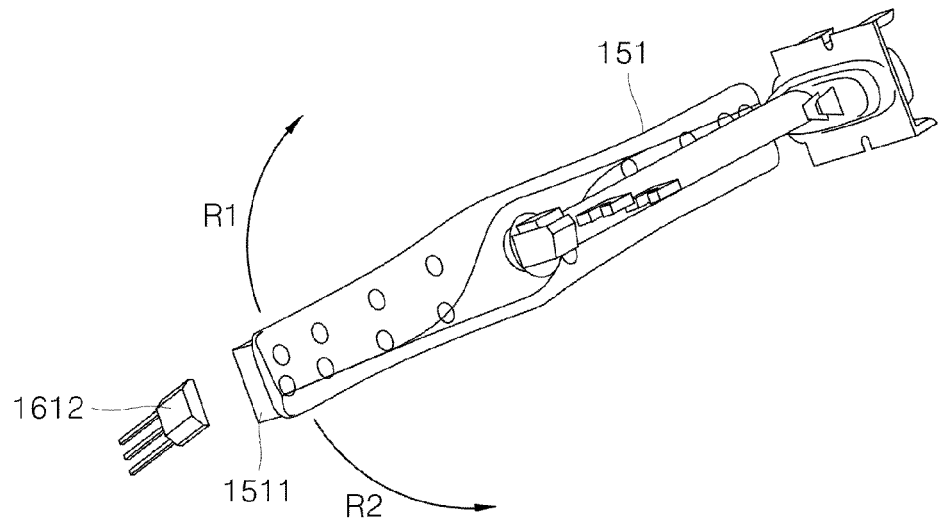
FIG. 11 is a view for describing a relationship between a rotation direction of the first nozzle and the position of a first Hall sensor, in the dishwasher of one embodiment.

A relationship between the position of the first nozzle 151 and the position of the first Hall sensor 1612 are described specifically with reference to FIGS. 10 and 11.

FIG. 10 is a view for describing a relationship between the position of the first nozzle and the position of a first Hall sensor, in the dishwasher of one embodiment.

Referring to FIG. 10, the first Hall sensor 1612 of the first sensing module 161 and the first nozzle 151 are viewed laterally.

The first nozzle 151 may move to a first position A that is an upper end, a second position B that is a middle end, and a third position C that is a lower end.

As the first sensing module 161 is coupled to the dispenser 170 through the fixation bracket 180, the first Hall sensor 1612 of the first sensing module 161 may move to the position corresponding to the middle of the first position A and the third position C, i.e., the second position B.

By disposing the first Hall sensor 1612 as described above, the first Hall sensor 1612 may sense a magnetic force generated by the first magnetic object 1511, regardless of the position where the first nozzle 151 is disposed, among the first position A, the second position B and the third position C. That is, the controller may sense a magnetic force generated by the first magnetic object 1511 even if the first nozzle 151 moves up and down.

FIG. 11 is a view for describing a relationship between a rotation direction of the first nozzle and the position of a Hall sensor, in the dishwasher of one embodiment.

Referring to FIG. 11, the first Hall sensor 1612 of the first sensing module 161 and the first nozzle 151 are viewed from above.

The first nozzle 151 may rotate in a first direction R1 or a second direction R2. At this time, the first direction R1 may be a clockwise direction, and the second direction R2 may be a counterclockwise direction.

When the first nozzle 151 rotates clockwise R1 in a state where the polarities of the first magnet 1511a are disposed as illustrated in FIG. 7, the first Hall sensor 1612 may first sense a magnetic force generated by the first pole 1511a_1, and then sense a magnetic force generated by the second pole 1511a_2. When the first nozzle 151 rotates counterclockwise R2, the first Hall sensor 1612 may first a magnetic force generated by the second pole 1511a_2, and then sense a magnetic force generated by the first pole 1511a_1. A difference in the output values based on results of sensing of the first Hall sensor 1612 is described specifically with reference to FIGS. 12 and 13.

Figure 12:
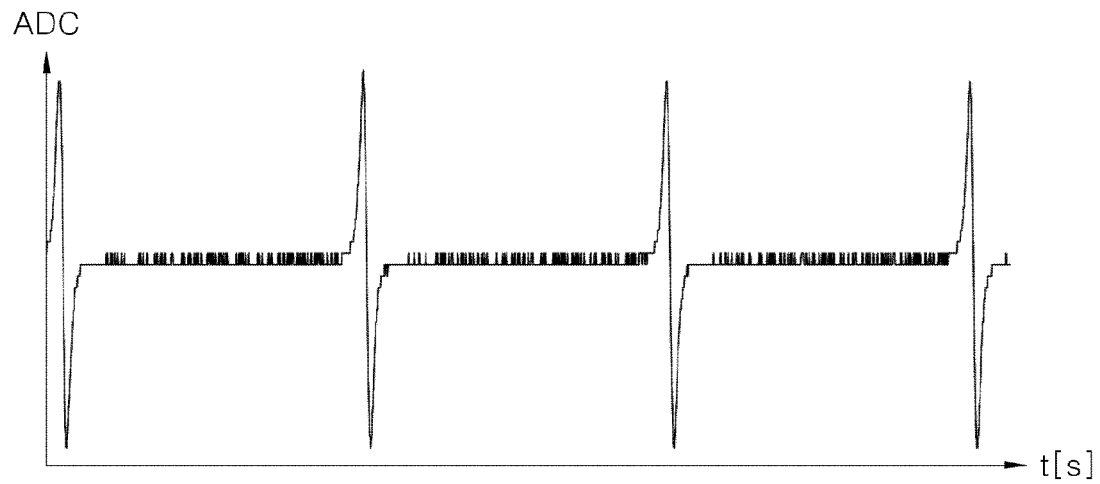
FIG. 12 is a graph showing results of sensing of the first sensing module as the first nozzle rotates in a first direction, in the dishwasher of one embodiment.
Figure 13:
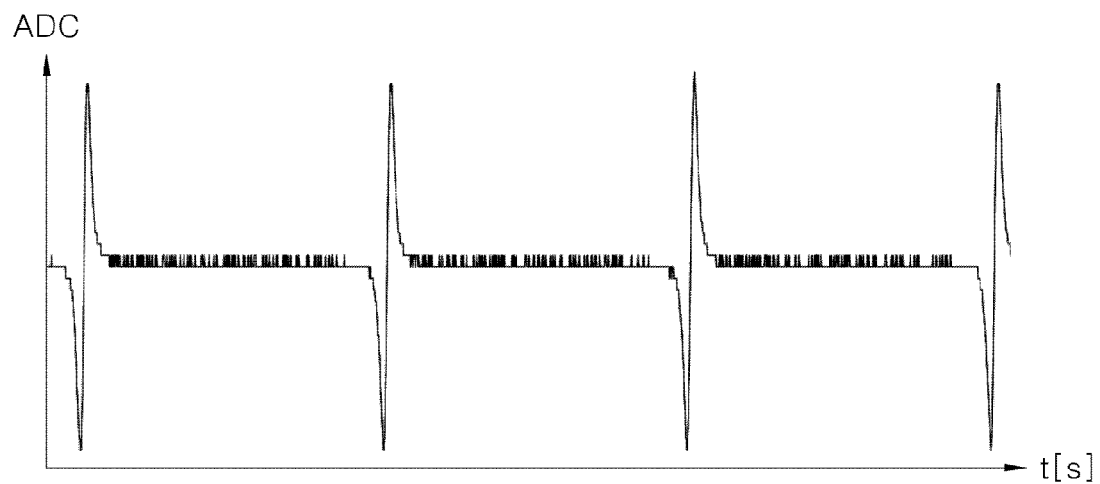
FIG. 13 is a graph showing results of sensing of the first sensing module as the first nozzle rotates in a second direction, in the dishwasher of one embodiment.

FIG. 12 is a graph showing results of sensing of the first sensing module as the first nozzle rotates in a first direction, in the dishwasher of one embodiment. FIG. 13 is a graph showing results of sensing of the first sensing module as the first nozzle rotates in a second direction, in the dishwasher of one embodiment.

Referring to FIGS. 12 and 13, a graph shows a change in ADC values that are output based on results of sensing of the first sensing module 161, over time.

As the first nozzle 151 rotates in the first direction R1, the first Hall sensor 1612 senses a magnetic force generated by the first pole 1511a_1 and then senses a magnetic force generated by the second pole 1511a_2.

When the first Hall sensor 1612 senses a magnetic force generated by the first pole 1511a_1, the first Hall sensor 1612 may output a smaller value than a value output when the first Hall sensor 1612 does not sense a magnetic force generated by the first pole 1511a_1. When the first Hall sensor 1612 senses a magnetic force generated by the second pole 1511a_2, the first Hall sensor may output a larger value than a value output when the first Hall sensor 1612 dose not sense a magnetic force generated by the second pole 1511a_2.

When the controller senses that the output value of the first Hall sensor 1612 decreases and then increases as illustrated in FIG. 12, the controller determines that a magnetic force generated by the first pole 1511a_1 is sensed first and then a magnetic force generated by the second pole 1511a_2 is sensed, and determines that the rotation direction of the first nozzle 151 is a clockwise direction R1.

Further, as the first nozzle 151 rotates in the second direction R2, the first Hall sensor 1612 first senses a magnetic force generated by the second pole 1511a_2 and then senses a magnetic force generated by the first pole 1511a_1.

Thus, in the case where the controller senses that the output value of the first Hall sensor 1612 increases and then decreases as illustrated in FIG. 13, the controller determines that a magnetic force generated by the second pole 1511a_2 is sensed first and then a magnetic force generated by the first pole 1511a_2 is sensed, and determines that the rotation direction of the first nozzle 151 is a counterclockwise direction R2.

Figure 14:
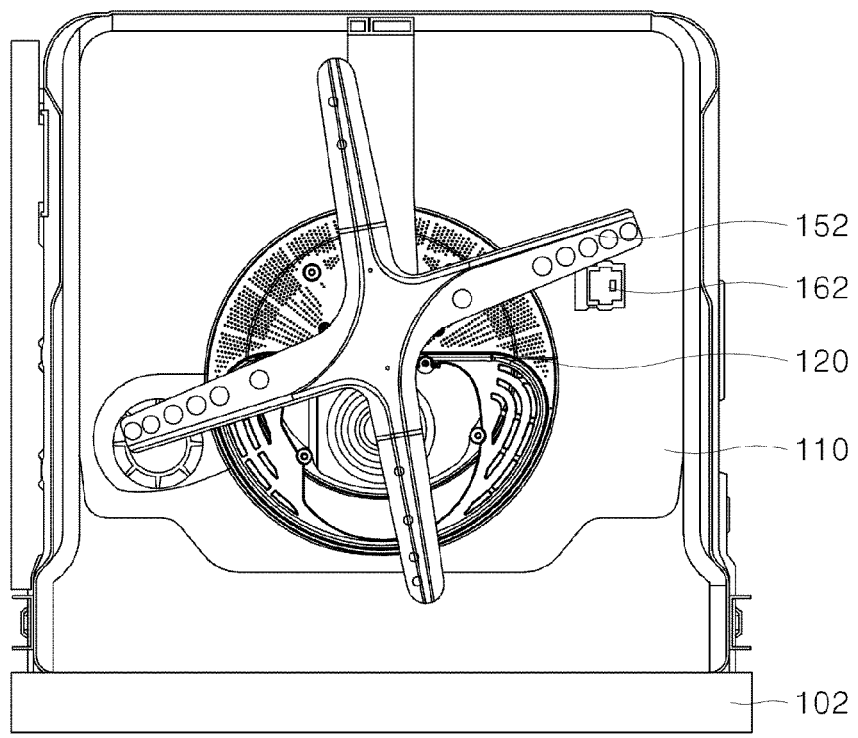
FIG. 14 is a view showing a configuration disposed at the lower side of a second nozzle, in the dishwasher of one embodiment.

FIG. 14 is a view showing a configuration disposed at the lower side of a second nozzle, in the dishwasher of one embodiment.

Referring to FIG. 14, the second nozzle 152 may be disposed near the lower surface of the tub 110 at the lower end of the wash space 111. The sump 120 is disposed in the lower portion of the tub 110. At this time, the second sensing module 162 is coupled to one side of the sump 120.

The second nozzle 152, as illustrated in FIG. 3, is disposed at the lower end of the second rack 142. A second magnetic object 1521 may be coupled to one end of the second nozzle 152, and a second weight 1522 may be provided at the other end of the second nozzle 152. A detailed structure of the second nozzle 152 is described with reference to FIG. 15.

Figure 15:
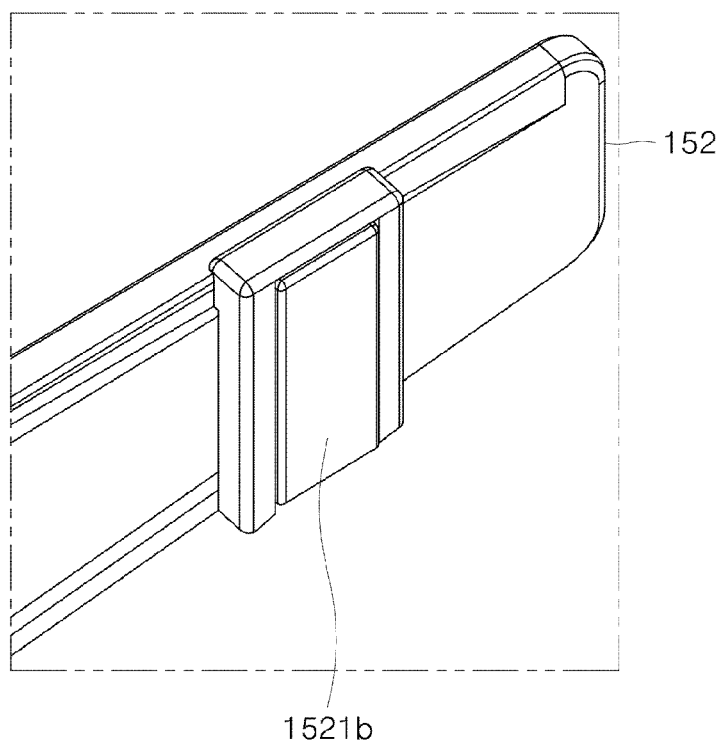
FIG. 15 is a view showing a structure in which a second magnetic object is coupled to the second nozzle, in the dishwasher of one embodiment.

FIG. 15 is a view showing a structure in which a magnetic object is coupled to the second nozzle, in the dishwasher of one embodiment.

Referring to FIG. 15, the second magnetic object 1521 is coupled to one end of the second nozzle 152. Though not illustrated in FIG. 15, the second weight 1522 is accommodated at the other end of the second nozzle 152, as illustrated in FIG. 3. At this time, the second weight 1522 may be accommodated in the other end of the second nozzle 152, or coupled to the lower side of the other end of the second nozzle 152 like the first weight 1512.

The second magnetic object 1521 rotates together with the second nozzle 152 as the second nozzle 152 rotates, causing a change in a magnetic field, to enable the second sensing module 162 to sense a magnetic force generated by the second magnetic object 1521. In one embodiment, the second magnetic object 1521 may be a magnet.

Figure 16:
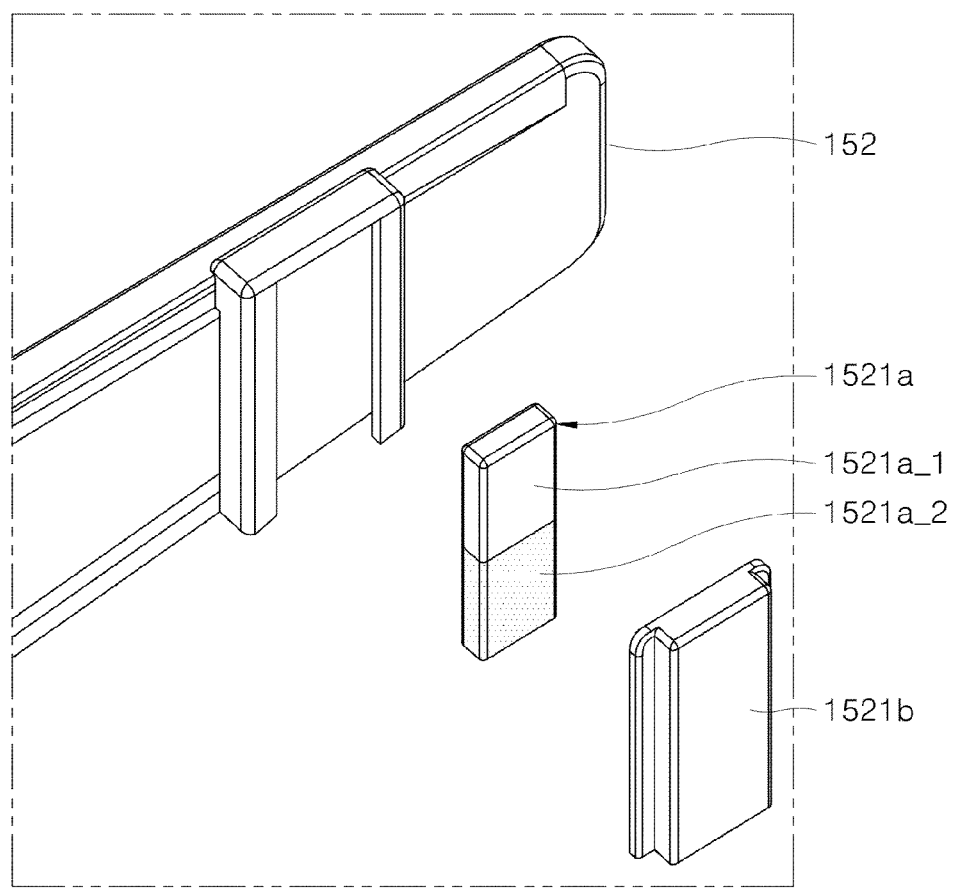
FIG. 16 is a view separately showing the structure in which the second magnetic object is coupled to the second nozzle, in the dishwasher of one embodiment.

A structure in which the second magnetic object 1521 is coupled to the second nozzle 152 is illustrated in FIG. 16.

FIG. 16 is a view separately showing the structure in which the magnetic object is coupled to the second nozzle, in the dishwasher of one embodiment.

Referring to FIG. 16, the second magnetic object 1521 may be coupled to the lower side of one end of the second nozzle 152.

The second magnetic object 1521 may be coupled to the lower side of one end of the second nozzle 152 in a way that a second magnet 1521a is accommodated inside a second magnet case 1521b. The second magnetic object 1521 may be coupled to the second nozzle 152 in a way that a first pole 1521a_1 and a second pole 1521a_2 of the second magnet 1521a respectively face the direction in which the second nozzle 152 rotates, while the first pole 1521a_1 and the second pole 1521a_2 face in opposite directions.

The second magnet case 1521b may have a shape corresponding to the shape of the second magnet 1521a. For example, in the case where the second magnet 1521a is shaped into a bar magnet, the second magnet case 1521b may be formed in a way that a bar magnet is accommodated.

Referring back to FIG. 15, the second weight 1522 has weight corresponding to the weight of the second magnetic object 1521. The second weight 1522, as described above, is disposed in an end portion of the second nozzle 152, which is opposite to the end portion of the second nozzle 152 where the second magnetic object 1521 is disposed, to enable the center of gravity of the second nozzle 152 to move to the center of the second nozzle 152. By disposing the second weight 1522 as describe above, the shake of the second nozzle 152 while rotating of the second nozzle 152 may be prevented, which may be caused by a misalignment of the center of gravity of the second nozzle 152 with the center of the second nozzle 152 due to the second magnetic object 1521 disposed at one end of the second nozzle 152.

Figure 17:
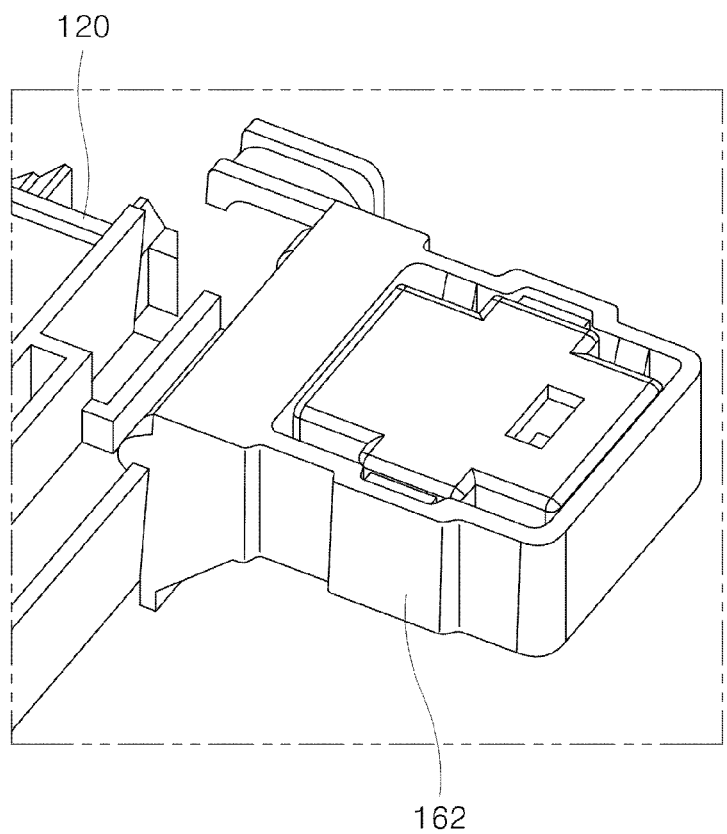
FIG. 17 is a view showing a structure in which the second sensing module is coupled to a sump, in the dishwasher of one embodiment.

FIG. 17 is a view showing a structure in which the second sensing module is coupled to a sump, in the dishwasher of one embodiment.

Referring to FIG. 17, the second sensing module 162 is coupled to one side of the sump 120. A detailed structure of the second sensing module is described with reference to FIG. 18.

Figure 18:
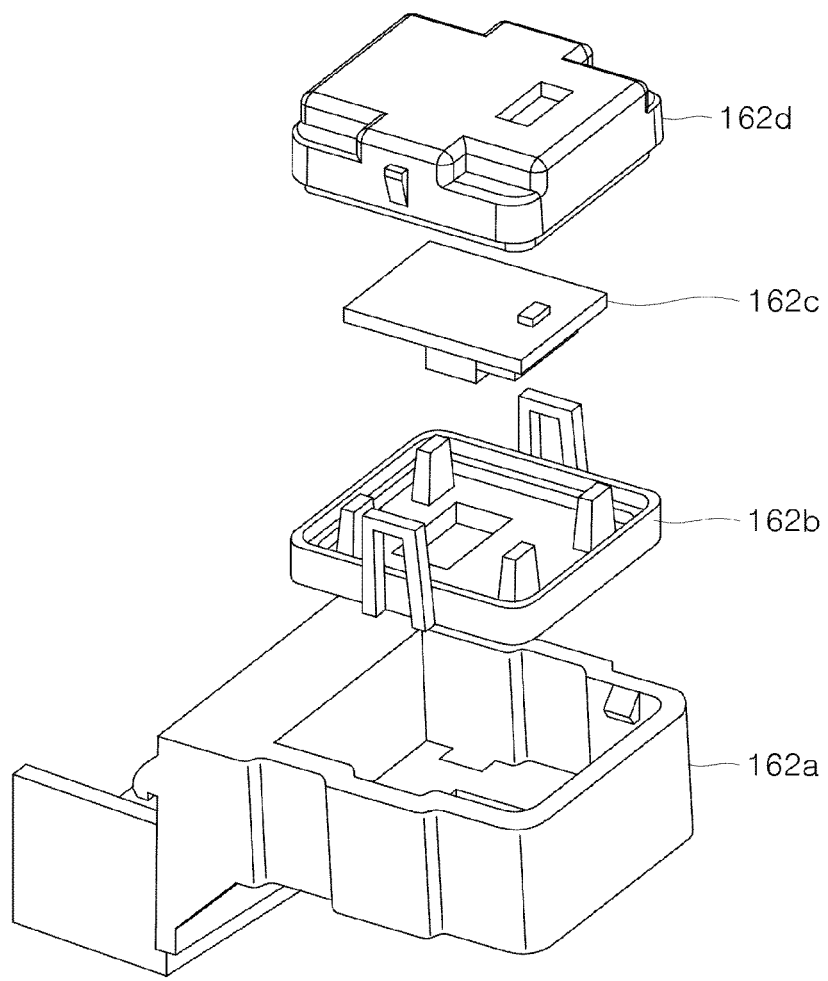
FIG. 18 is a view separately showing the second sensing module of the dishwasher of one embodiment.

FIG. 18 is a view separately showing the second sensing module of the dishwasher of one embodiment.

Referring to FIG. 18, the second sensing module 162 comprises a second sensing module bracket 162a, a second sensing module case 162b, a second Hall sensor 162c and a second sensing module cover 162d.

The second sensing module bracket 162a couples the second sensing module 162 to one side of the sump 120. To this end, the second sensing module bracket 162a may have a structure corresponding to the structure of the sump 120, to be coupled to the sump 120.

The second sensing module case 162b is accommodated in the second sensing module bracket 162a. The second sensing module case 162b accommodates the second Hall sensor 162c.

The second sensing module cover 162d covers the second Hall sensor 162c such that the second Hall sensor 162c accommodated in the second sensing module case 162b is not exposed to the outside.

The second Hall sensor senses a change in the magnetic force generated by the second magnetic object 1521. The second Hall sensor 162c may be mounted on a substrate.

The second Hall sensor 162c may be a linear Hall sensor that can output different output values depending on the polarity of a sensed magnetic force. A method of sensing a rotation direction of the second nozzle 152 with the second Hall sensor 162c is the same as the above-described method of sensing a rotation direction of the first nozzle 151 with the first Hall sensor 1612. Thus, a detailed description of the method is not provided.

Referring back to FIG. 3, results of the sensing of the above-described first sensing module 161 and second sensing module 162 may be output to the controller.

The controller controls the entire operations of the dishwasher. The controller may be embodied in a way that the controller comprises a physical element comprising at least one of application specific integrated circuits (ASICs), digital signal processors (DSPs), digital signal processing devices (DSPDs), programmable logic devices (PLDs), field programmable gate arrays (FPGAs), controllers, micro-controllers and microprocessors.

The controller receives sensing results from the first sensing module 161 and the second sensing module 162, and based on the sensing results, determines one or more of a direction of rotation of the nozzles 151, 152, a speed of rotation of the nozzles 151, 152 and whether the nozzles 151, 152 rotate, to output an abnormality notification to the user or control wash water supplied to the nozzles 151, 152 through the wash pump 130.

Detailed operations of the controller are described with reference to FIGS. 19 to 22.

Figure 19:
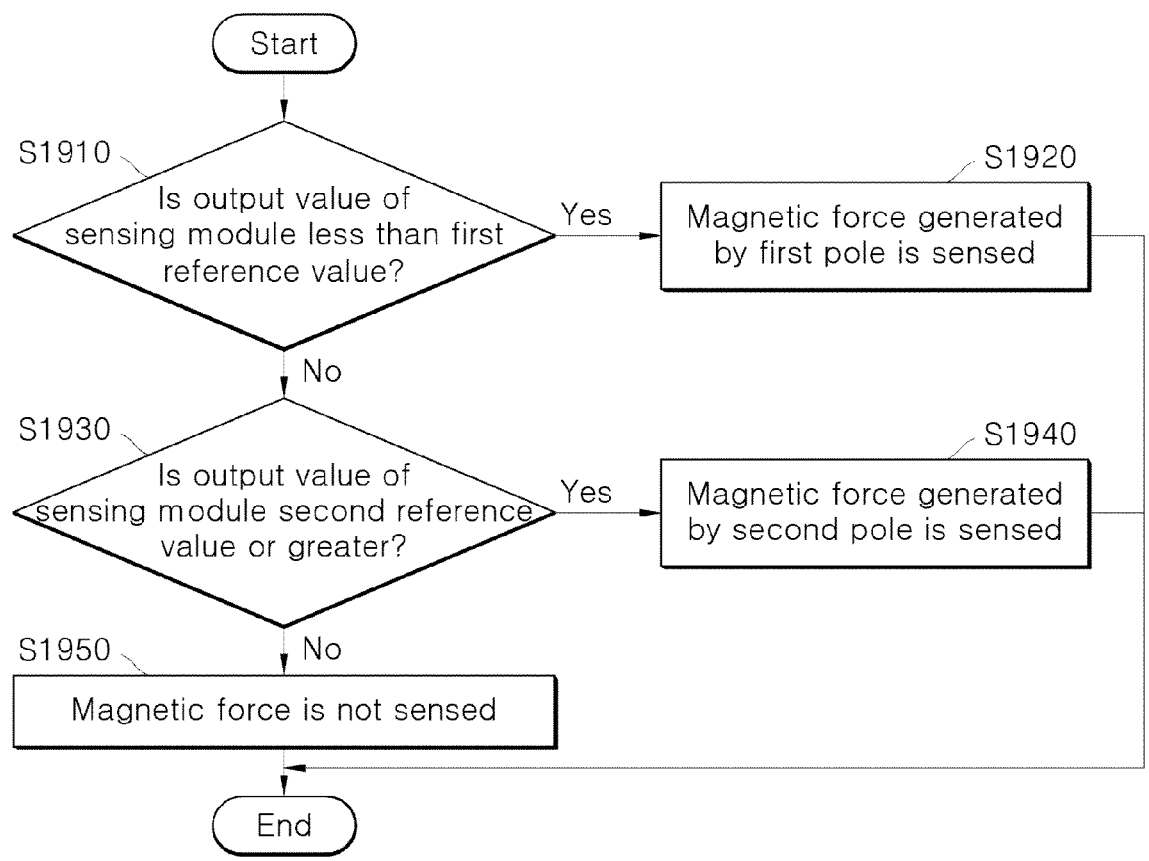
FIG. 19 is a flowchart for describing a process in which the dishwasher of one embodiment determines the polarity of a magnetic force.

FIG. 19 is a flowchart for describing a process in which the dishwasher of one embodiment determines the polarity of a magnetic force.

Referring to FIG. 19, the controller determines whether an output value of the sensing modules 161, 162 is less than a first reference value (S1910). The first reference value denotes a reference value for determining whether a magnetic force generated by the first pole 1511a_1, 1521a1 is sensed. The first reference value may be set to a smaller value than a value output when the magnetic force generated by the first pole 1511a1, 1521a1 is not sensed.

When the output value of the sensing module 161, 162 is less than the first reference value, the controller determines that a magnetic force generated by the first pole 1511a1, 1521a1 is sensed (S1920).

When the output value of the sensing module 161, 162 equals to or greater than the first reference value, the controller determines whether the output value of the sensing module 161, 162 equals to or greater than a second reference value (S1930). The second reference value is a reference value for determining whether a magnetic force generated by the second pole 1511a_2, 1521a_2 is sensed. The second reference value may be set to a larger value than a value output when the magnetic force generated by the second pole 1511a_2, 1521a_2 is not sensed.

In the case where the output value of the sensing module 161, 162 is the second reference value or greater, the controller determines that a magnetic force generated by the second pole 1511a2, 1521a2 is sensed (S1940).

When the output value of the sensing module 161, 162 is less than the second reference value, the controller determines that a magnetic force generated by the magnetic object 1511, 1521 is not sensed (S1950).

Figure 20:
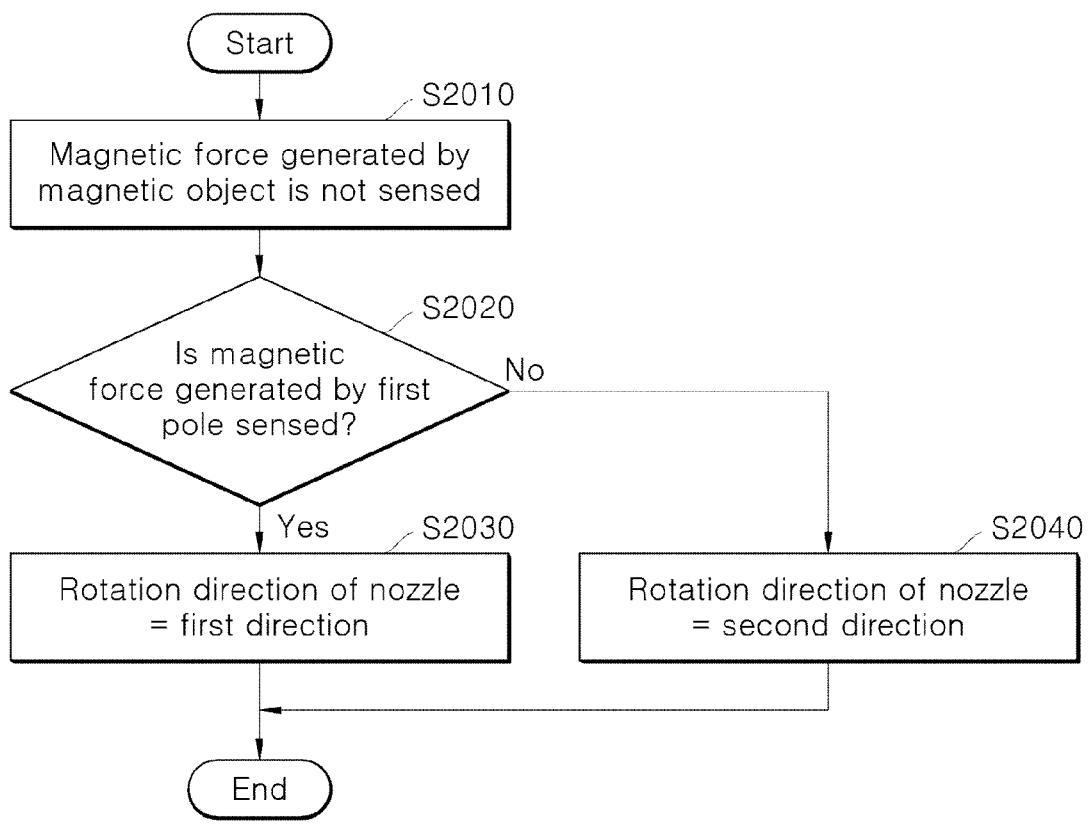
FIG. 20 is a flowchart for describing a process in which the dishwasher of one embodiment determines a rotation direction of a nozzle.

FIG. 20 is a flowchart for describing a process in which the dishwasher of one embodiment determines a rotation direction of a nozzle.

Referring to FIG. 20, the controller first determines that sensing module 161, 162 does not sense a magnetic force generated by the magnetic object 1511, 1521 (S2010).

In this state, the controller determines whether the sensing module 161, 162 senses a magnetic force generated by the first pole 1511a_1, 1521a_1 (S2020).

When a magnetic force generated by the magnetic object 1511, 1521 is not sensed through the sensing module 161, 162 and then a magnetic force generated by the first pole 1511a1, 1521a1 of the magnetic object 1511, 1521 is first sensed, the controller may determine that the rotation direction of the nozzle 151, 152 is the first direction (S2030).

When a magnetic force generated by the magnetic object 1511, 1521 is not sensed through the sensing module 161, 162 and then a magnetic force generated by the second pole 1511a_2, 1521a_2 of the magnetic object 1511, 1521 is first sensed, the controller may determine that the rotation direction of the nozzle 151, 152 is the second direction (S2040).

Figure 21:
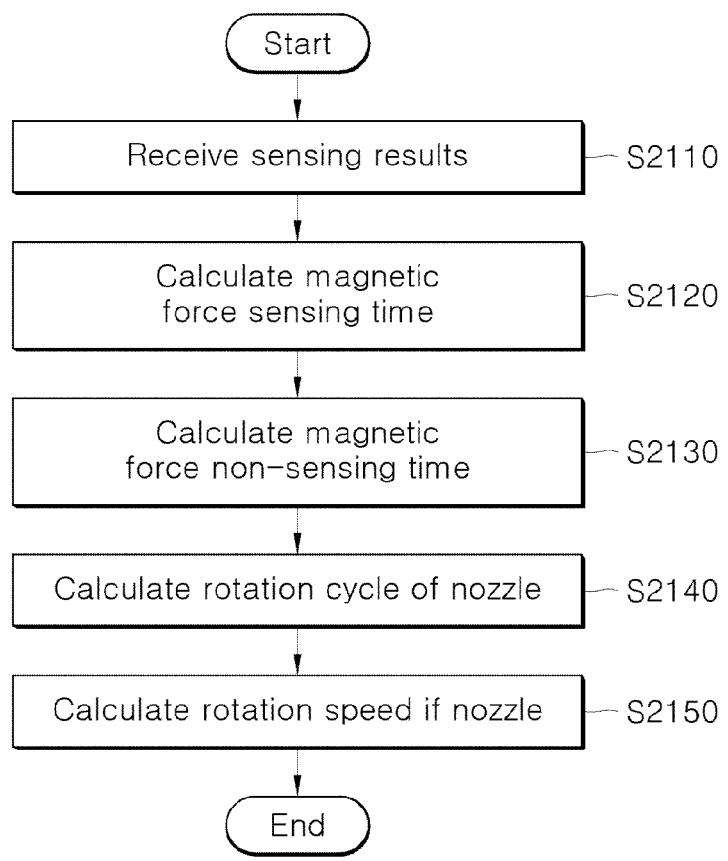
FIG. 21 is a flowchart for describing a process in which the dishwasher of one embodiment determines a rotation speed of a nozzle.

FIG. 21 is a flowchart for describing a process in which the dishwasher of one embodiment determines a rotation speed of a nozzle.

Referring to FIG. 21, the controller receives sensing results from the sensing modules 161, 162 (S2110).

Then the controller calculates magnetic force sensing time for which the sensing modules 161, 162 sense a magnetic force (S2120). Additionally, the controller calculates magnetic force non-sensing time for which the sensing modules 161, 162 cannot sense a magnetic force (S2130). Step 2120 and step 2130 may be performed in reverse order.

Then the controller calculates rotation cycles of the nozzles 151, 152 (S2140). The rotation cycles of the nozzles 151, 152 may be calculated by adding the magnetic force sensing time and the magnetic force non-sensing time. For example, when the magnetic force sensing time is 0.5 s and the magnetic force non-sensing time is 4.5 s, the rotation cycles of the nozzles 151, 152 may be calculated as 5s.

Then the controller calculates rotation speeds of the nozzles 151, 152 (S2150). The rotation speeds of the nozzles 151, 152 may be calculated based on the rotation cycles of the nozzles 151, 152. For example, when the rotation cycles of the nozzles 151, 152 are 5 s, it means that the nozzles 151, 152 rotate 12 times for one minute. Thus, the rotation speeds of the nozzles 151, 152 may be calculated as 12 RPM.

The controller, as described above, may calculate the rotation speeds of the nozzles 151, 152, based on the magnetic force sensing time and the magnetic force non-sensing time through the sensing modules 161, 162.

Figure 22:
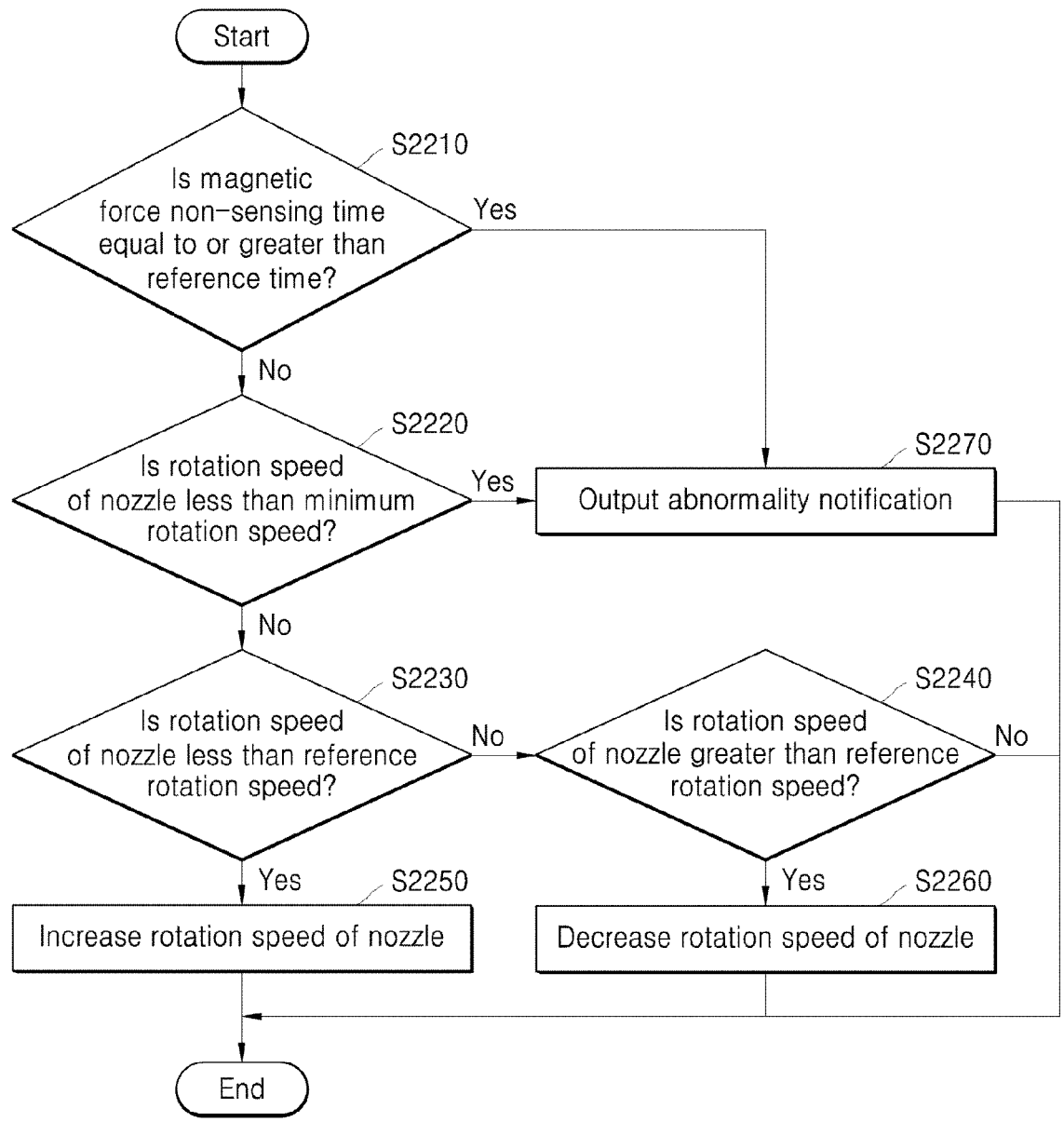
FIG. 22 is a flowchart for describing a method in which the dishwasher of one embodiment controls the rotation of a nozzle or outputs an abnormality notification to the user, based on whether a nozzle rotates, a rotation speed of the nozzle, and a rotation direction of the nozzle.

FIG. 22 is a flowchart for describing a method in which the dishwasher of one embodiment controls the rotation of a nozzle or outputs an abnormality notification to the user, based on whether a nozzle rotates, a rotation speed of the nozzle, and a rotation direction of the nozzle.

Referring to FIG. 22, the controller determines whether the magnetic force non-sensing time is predetermined reference time or greater (S2210).

The reference time denotes a time criterion for determining that the nozzles 151, 152 do not rotate smoothly. For example, the reference time may be set to 10 s. That is, when a magnetic force is not sensed through the sensing modules 161, 162 for the reference time or greater, the controller may determine that the nozzles 151, 152 do not rotate smoothly.

Accordingly, when the magnetic force non-sensing time is the predetermined reference time or greater, the controller outputs an abnormality notification to the user (S2270). The controller may output an abnormality notification by transmitting a notification message to a user terminal linked with the dishwasher 100, or outputting a notification through an interface (not illustrated), a speaker (not illustrated) or an LED (not illustrated) included in the dishwasher 100.

Determining that the magnetic force non-sensing time is less than the predetermined reference time, the controller determines whether the rotation speed of the nozzle is less than a predetermined minimum rotation speed (S2220).

The minimum rotation speed is a speed criterion for determining that the nozzles 151, 152 do not rotate smoothly. For example, the minimum rotation speed may be set to 6 RPM. That is, when the rotation speeds of the nozzles 151, 152 are less than the minimum rotation speed, the controller may determine that the nozzles 151, 152 do not rotate smoothly.

Accordingly, when the rotation speeds of the nozzles 151, 152 are less than the minimum rotation speed, the controller outputs an abnormality notification to the user (S2270).

Determining that the rotations speeds of the nozzles 151, 152 are the minimum rotation speed or greater, the controller determines whether the rotation speeds of the nozzles 151, 152 are less than a predetermined reference rotation speed (S2230).

The reference rotation speed is for the controller to control the nozzles 151, 152 to rotate. The reference rotation speed may be different from the rotation speed of the nozzle 151, 152, for the reason that contaminants are excessively stacked in the filter 123 or a wash target is disposed in an area of rotation of the nozzle 151, 152, and the like.

The reference rotation speed may be set differently, depending on the rotation directions of the nozzles 151, 152.

When the rotation speeds of the nozzle 151, 152 are less than the reference rotation speed, the controller controls wash water supplied to the nozzles 151, 152 through the wash pump 130, to increase the rotation speeds of the nozzles 151, 152 (S2250).

Unless the rotation speeds of the nozzles 151, 152 are less than the reference rotation speed, the controller determines whether the rotation speeds of the nozzles 151, 152 are greater than the reference rotation speed (S2240).

When the rotation speeds of the nozzles 151, 152 are greater than the reference rotation speed, the controller controls wash water supplied to the nozzles 151, 152 through the wash pump 130, to decrease the rotation speeds of the nozzles 151, 152 (S2260).

Unless the rotation speeds of the nozzles 151, 152 are greater than the reference rotation speed, the rotation speeds of the nozzles 151, 152 are the same as the reference rotation speed. Accordingly, the controller exerts no control.

The controller, as described above, may output an abnormality notification to the user, based on whether the nozzle 151, 152 rotates, or control the rotation of the nozzle 151, 152, based on the rotation speed and rotation direction of the nozzle 151, 152.

In the dishwasher 100 of one embodiment, a single magnet 1511a, 1521a can be used to sense whether the nozzle 151, 152 rotates, by using the magnetic object 1511, 1521 that is coupled to one end of the nozzle 151, 152, and the sensing module 161, 162 that comprises the Hall sensor 1612, 162c.

Further, the magnetic object 1511, 1521 are coupled to the nozzle 151, 152 in the way that the first pole 1511a1, 1521a1 and the second pole 1511a2, 1521a2 of the magnetic object 1511, 1521 face the rotation direction of the nozzle 151, 152, and a linear Hall sensor is used as the Hall sensor 1612, 162c, to sense the rotation direction and rotation speed of the nozzle 151, 152 and precisely control the rotation of the nozzle 151, 152, ensuring improvement in the performance of the dishwasher.

The embodiments are described above with reference to a number of illustrative embodiments thereof. However, embodiments are not limited to the embodiments and drawings set forth herein, and numerous other modifications and embodiments can be drawn by one skilled in the art within the technical scope of the disclosure. Further, the effects and predictable effects based on the configurations in the disclosure are to be included within the range of the disclosure though not explicitly described in the description of the embodiments.

The invention claimed is:

1. A dishwasher, comprising:
a tub having a wash space that is configured to receive therein a wash target;
a sump disposed at a lower end of the tub and configured to receive wash water;
a wash pump configured to supply the wash water from the sump to a nozzle;
a rack disposed in the wash space and configured to accommodate the wash target;
the nozzle that (i) is disposed at a lower end of the rack, (ii) is configured to be rotated by a force of the wash water supplied from the wash pump, (iii) is configured to spray the wash water to the wash target, and (iv) has a magnetic object coupled to one end of the nozzle, wherein a first pole and a second pole of the magnetic object are oriented circumferentially with respect to a rotation axis of the nozzle;
a sensing module comprising a Hall sensor that is configured to sense a magnetic force generated by a rotation of the magnetic object with the nozzle; and
a controller configured to:
receive sensing results from the sensing module,
determine, based on the sensing results, one or more of a rotation direction of the nozzle, a rotation speed of the nozzle, or whether the nozzle is rotating,
based on the determination, output an abnormality notification to a user or control wash water supplied to the nozzle through the wash pump,
determine, based on (i) a magnetic force generated by the magnetic object being not sensed through the sensing module and (ii) then a magnetic force generated by the first pole of the magnetic object being first sensed, that the rotation direction of the nozzle is a first direction, and
determine, based on (i) a magnetic force generated by the magnetic object being not sensed through the sensing module and (ii) then a magnetic force generated by the second pole of the magnetic object being first sensed, that the rotation direction of the nozzle is a second direction.

2. The dishwasher of claim 1, wherein:
the rack comprises a first rack disposed in an upper portion of the wash space and configured to move up and down,
the nozzle comprises a first nozzle disposed at a lower end of the first rack and configured to move up and down together with the first rack, and
the sensing module comprises a first sensing module comprising a Hall sensor that is disposed in a position corresponding to a middle end of a range in which the first nozzle moves up and down.

3. The dishwasher of claim 2, wherein a first magnetic object is coupled to one end of the first nozzle, and
wherein a first weight having a weight that corresponds to a weight of the first magnetic object is accommodated at the other end of the first nozzle.

4. The dishwasher of claim 2, further comprising:
a door provided on one surface of the tub and configured to open and close the wash space;
a dispenser disposed in one area of the door and configured to supply detergent to the wash space; and
a fixation bracket that is coupled to the dispenser and on which the first sensing module is mounted.

5. The dishwasher of claim 1, wherein:
the rack comprises a second rack disposed in a lower portion of the wash space,
the nozzle comprises a second nozzle disposed at a lower end of the second rack, and
the sensing module comprises a second sensing module coupled to one side of the sump.

6. The dishwasher of claim 5, wherein a second magnetic object is coupled to one end of the second nozzle, and
wherein a second weight having a weight that corresponds to a weight of the second magnetic object is accommodated at the other end of the second nozzle.

7. The dishwasher of claim 1, wherein the Hall sensor is a linear Hall sensor.

8. The dishwasher of claim 1, wherein the controller is configured to:
determine, based on an output value of the sensing module being less than a predetermined first reference value, that a magnetic force generated by the first pole of the magnetic object is sensed,
determine, based on an output value of the sensing module being equal to or greater than a predetermined second reference value, that a magnetic force generated by the second pole of the magnetic object is sensed, and
determine, based on an output value of the sensing module being equal to or greater than the first reference value and less than the second reference value, that a magnetic force generated by the magnetic object is not sensed.

9. The dishwasher of claim 1, wherein the controller is configured to calculate a rotation speed of the nozzle based on (i) a magnetic force sensing time for which a magnetic force generated by the magnetic object is sensed through the sensing module, and (ii) a magnetic force non-sensing time for which a magnetic force generated by the magnetic object is not sensed through the sensing module.

10. The dishwasher of claim 9, wherein the controller is configured, based on the magnetic force non-sensing time being equal to or greater than a predetermined reference time, to (i) determine that the nozzle is restricted and (ii) output an abnormality notification to the user.

11. The dishwasher of claim 9, wherein the controller is configured, based on a rotation speed of the nozzle being less than a predetermined minimum rotation speed, to (i) determine that the nozzle is restricted and (ii) output an abnormality notification to the user.

12. The dishwasher of claim 9, wherein the controller is configured, based on comparing a rotation speed of the nozzle and a predetermined reference rotation speed, to control the wash water supplied to the nozzle through the wash pump.

13. The dishwasher of claim 12, wherein the reference rotation speed is set according to a rotation direction of the nozzle.

14. The dishwasher of claim 12, wherein the controller is configured to:
control, based on a rotation speed of the nozzle being less than the reference rotation speed, the wash water supplied to the nozzle through the wash pump to increase the rotation speed of the nozzle, and
control, based on a rotation speed of the nozzle being equal to or greater than the reference rotation speed, the wash water supplied to the nozzle through the wash pump to decrease the rotation speed of the nozzle.

* * * * *